US012130372B2

United States Patent
Shaw et al.

(10) Patent No.: US 12,130,372 B2
(45) Date of Patent: Oct. 29, 2024

(54) ASSET TRACKER, METHOD OF TRACKING AN ASSET AND SECURITY SERVER FOR LOCATING THE ASSET

(71) Applicant: EXACTTRAK LIMITED, Banbury (GB)

(72) Inventors: Norman Shaw, Banbury (GB); John Pragnell, Banbury (GB)

(73) Assignee: EXACTTRAK LIMITED (GB)

( * ) Notice: Subject to any disclaimer, the term of this patent is extended or adjusted under 35 U.S.C. 154(b) by 162 days.

(21) Appl. No.: 17/763,630

(22) PCT Filed: Sep. 24, 2020

(86) PCT No.: PCT/GB2020/052315
§ 371 (c)(1),
(2) Date: Mar. 24, 2022

(87) PCT Pub. No.: WO2021/058960
PCT Pub. Date: Apr. 1, 2021

(65) Prior Publication Data
US 2022/0373639 A1 Nov. 24, 2022

(30) Foreign Application Priority Data
Sep. 25, 2019 (GB) ...................................... 1913843

(51) Int. Cl.
*G01S 5/02* (2010.01)
*G01P 13/00* (2006.01)
(52) U.S. Cl.
CPC ............ *G01S 5/0294* (2013.01); *G01P 13/00* (2013.01); *G01S 5/02585* (2020.05)

(58) Field of Classification Search
CPC .......................... G01S 5/0294; G01S 5/02585
See application file for complete search history.

(56) References Cited

U.S. PATENT DOCUMENTS

| 8,890,705 B2 | 11/2014 | Farley et al. |
| 9,602,962 B2 | 3/2017 | Edge |

(Continued)

FOREIGN PATENT DOCUMENTS

| CN | 104407881 | 3/2015 |
| WO | 2012065184 | 5/2012 |

(Continued)

OTHER PUBLICATIONS

International Search Report and Written Opinion dated Jan. 28, 2021 issued in corresponding International Application No. PCT/GB2020/052315.
Great Britain Examination Report dated Jan. 25, 2022 issued in corresponding Great Britain Application No. 1913843.7.

(Continued)

*Primary Examiner* — Nabil H Syed
(74) *Attorney, Agent, or Firm* — Onello & Mello, LLP

(57) ABSTRACT

A tracking device (150) for tracking an asset (110) at a facility is described herein. The tracking device comprises a communication interface (120) configured to communicate with at least one beacon (101-1, 101-2, 101-*n*) in proximity to the tracking device and an altitude sensor (125). The tracking device is configured to receive, via the communication interface, at least one signal from the at least one beacon, receive, via the altitude sensor, altitude information. The tracking device is configured to transmit, for use in tracking the asset at the facility, information based on the at least one signal and the altitude information.

20 Claims, 4 Drawing Sheets

(56) References Cited

U.S. PATENT DOCUMENTS

| | | | |
|---|---|---|---|
| 10,097,952 B2 | 10/2018 | Buck, Jr. et al. | |
| 10,178,495 B2 | 1/2019 | Cerchio et al. | |
| 10,528,902 B2 | 1/2020 | Morgenthau et al. | |
| 2012/0013475 A1 | 1/2012 | Farley et al. | |
| 2015/0097674 A1* | 4/2015 | Mondal | H04W 4/029 |
| | | | 340/572.1 |
| 2015/0201305 A1 | 7/2015 | Edge | |
| 2016/0050519 A1* | 2/2016 | Sandin | G08B 21/028 |
| | | | 340/8.1 |
| 2017/0195852 A1* | 7/2017 | Theurer | H04W 4/02 |
| 2017/0270481 A1 | 9/2017 | Morgenthau et al. | |
| 2017/0339519 A1 | 11/2017 | Buck, Jr. et al. | |
| 2018/0109921 A1 | 4/2018 | Cerchio et al. | |
| 2018/0349651 A1* | 12/2018 | Snediker | G08B 13/14 |
| 2019/0154792 A1* | 5/2019 | Seman, Jr. | G06Q 10/08 |
| 2020/0027026 A1* | 1/2020 | Cook | G06N 3/04 |

FOREIGN PATENT DOCUMENTS

| | | |
|---|---|---|
| WO | 2018026988 | 2/2018 |
| WO | 2018126199 | 7/2018 |

OTHER PUBLICATIONS

Great Britain Combined Search and Examination Report dated Jan. 15, 2020 issued in corresponding Great Britain Application No. 1913843.7.

Great Britain Examination Report dated Jul. 5, 2023 issued in Great Britain Application No. 1913843.7.

Great Britain Examination Report dated Jul. 22, 2022 issued in Great Britain Application No. 1913843.7.

Great Britain Examination Report dated Oct. 24, 2023 issued in Great Britain Application No. 1913843.7.

"Bluetooth Beacons Provide New Value Inside the Hospital", Jibestream. com (Nov. 3, 2015). Originally accessed Aug. 23, 2018. Currently accessible on the internet: https://web.archive.org/web/20160629085601/https://www.jibestream.com/blog/bluetooth-beacons-provide-new-value-inside-the-hospital.

Park et al. "Three-dimensional positioning system using Bluetooth low-energy beacons", International Journal of Distributed Sensor Networks, vol. 12, Sep. 1, 2016, 11 pages. DOI: 10.1177/1550147716671720, ijdsn.sagepub.com.

Great Britain Combined Search and Examination Report dated Jan. 31, 2024 issued in Great Britain Application No. 2319897.1.

* cited by examiner

ASSET TRACKER, METHOD OF TRACKING AN ASSET AND SECURITY SERVER FOR LOCATING THE ASSET

FIELD OF THE INVENTION

The present invention relates to a tracking device, security server and method for tracking assets at a facility.

BACKGROUND

In a large facility, for example a hospital, there can be a large number of assets located throughout the facility. Knowing where all the assets are located within the facility is desired. However, successfully knowing the location of all the assets within a facility can be a difficult task, particularly when the assets are frequently moved throughout the facility and a large number of both staff and public are free to move within the facility at all hours.

SUMMARY

Aspects of the invention are set out in the independent claims and preferred features are set out in the dependent claims.

According to a first aspect of the disclosure there is provided a tracking device for tracking an asset at a facility, the tracking device comprising: a communication interface configured to communicate with at least one beacon in proximity to the tracking device; and an altitude sensor. The tracking device is configured to receive, via the communication interface, at least one signal from the at least one beacon, and receive, via the altitude sensors, altitude information. The tracking device is configured to transmit, for use in tracking the asset at the facility, information based on the at least one signal and the altitude information. In some examples the tracking device may be configured to encrypt the transmitted information.

The assets may include important or expensive equipment, for example equipment that may contain confidential patient information. Tracking where the assets are within the facility may help to prevent such assets being stolen or inadvertently being removed from the facility, for example reducing the risk that confidential patient information is disclosed to third parties.

Advantageously, the signal received from the at least one beacon may be indicative of a location that, when combined with altitude data, can be used to determine the location of a tracking device coupled to an asset at a facility.

It will be understood that the beacons may be located at fixed and/or known locations about the facility and are configured to communicate with the tracking device through a signal. The locations of the beacons may be fixed, or may be movable. Beacons may impart information about where an asset is located within a radius of the beacon. It will be understood that in some examples the tracking device may be configured to receive signals from more than one beacon to help improve the determination of the location of the asset. For example, signals from at least two, for example three or more beacons, may be used to triangulate a position of the asset within the facility. For example, the tracking device or security server may use the relative signal strengths and/or signal time of flights from each of the plurality of beacons to determine a relative position with respect to the beacons.

Altitude sensors provide altitude information that is indicative of the height of the asset. The altitude information may be based on barometric data—for example, the altitude sensor may comprise a barometric pressure sensor. Altitude information may be particularly important in facilities having two or more stories. In combination, the information provided by the at least one signal from the beacon and the altitude information provided by the altitude sensor can be used to determine a location of the asset in three dimensions with a relatively high degree of accuracy, particularly when compared to other tracking technologies when used indoors.

The at least one signal may comprise at least one of: (a) a beacon identifier, (b) a signal strength of the received at least one signal, and (c) information indicative of a time of flight between the tracking device and the at least one beacon. The beacon identifier may comprise information indicative of a status of the beacon—for example if the beacon is operating in a particular mode of operation, and/or if the beacon is operating according to a particular security profile or policy.

In some examples the tracking device may be configured to calculate the time of flight of the signal—for example, if the tracking device requests a signal from the beacon the tracking device may be configured to determine the time of flight based on the time difference between requesting a signal from the beacon and receiving a signal in response to the request. Additionally or alternatively, the at least one signal may comprise timing information, for example timing information indicating when the signal was sent, and the tracking device may be configured to determine the time of flight based on the difference between the timing information contained in the signal received from the beacon and the current time. In such examples it will be understood that the tracking device and the beacon may both have internal clocks that are synchronised with each other.

The at least one beacon may be a short-range communication beacon, such that communication of the tracking device with the at least one beacon is indicative of the tracking device being in a localised area local to the beacon. The signal, transmitted by the at least one beacon and received at the tracking device may be a radio frequency signal.

Altitude information may comprise information indicative of a measured height, a floor number of the facility, or may indicate relative altitude in comparison to one or more features of the facility. Other altitude information may additionally indicate a change in altitude, e.g. from a default or selected position, and/or may be indicative of relative changes in altitude, for example, that an asset has been lifted above a rest position.

The communication interface and/or the at least one beacon may be configured to communicate via a short-range communication network, and therefore may have a short-range communication interface. The at least one beacon itself may be configured to communicate via Bluetooth®, WiFi® and/or Zigbee® communication protocols. In some examples the tracking device and/or the at least one beacon may comprise an additional communication interface. For example, the tracking device and/or the at least one beacon may comprise a long range communications interface for communication via a long-range communication network, such as a telecommunication interface, for example, a GSM module. Additionally or alternatively the tracking device and/or beacon may also be configured to connect to the Internet, for example via a wireless or wired network communication interface.

In some embodiments, the tracking device may be configured to listen for the at least one signal from the beacon, for example via the short-range communication network such as a Wifi®, Bluetooth® and/or ZigBee® network. For example, the at least one beacon may periodically broadcast the at least one signal to its neighbouring environment. Additionally or alternatively the tracking device may be configured to periodically "poll" its surrounding environment for responses from neighbouring beacons. Any neighbouring beacons may be configured to send a signal in response to a poll signal being sent by the tracking device.

Advantageously, embodiments of the first aspect of the disclosure enable the location of the tracking device at the facility to be more easily and effectively determined. A beacon identifier may comprise information such as a unique code/name for each beacon at the facility. The signal strength and/or time of flight may be indicative of the proximity of the beacon to the device. If the tracking device receives several signals from different beacons, the position of the asset (to which the tracking device may be attached) may be more accurately calculated by determining where the tracking device is in relation to the known location of two or more beacons and the relative signal strength/time of flight between the two. For example, if a signal is received from a first and second beacon and the signal strength of the first signal is greater than that received from the second signal, it may be determined that the asset is between the first and second beacons at a location closer to the first beacon.

Optionally, the processor is configured to transmit the information when the signal strength of the received at least one signal is greater than a signal strength threshold; and/or wherein the time of flight is greater than a time of flight threshold. Comparative measurements of the signal strength from one or more beacons may indicate that the asset has been moved, based on differences between a recently received signal and a previously received signal.

In some examples, determining that the signal strength is below the signal strength threshold may trigger an alert or an event, for example indicating that the tracking device is close to being out of range of the beacon. In some examples, if the strength of a signal received from a beacon has decreased relative to a signal previously received from that beacon, the tracking device may be configured to try to get a signal from other beacons, for example in a vicinity of the beacon so that the tracking device is configured to listen for an alternative signal.

Additional information, for example information concerning the tracking device or asset, may also be transmitted by the tracking device. The additional information may comprise one or more of: calendar information comprising data concerning the current and/or future use of the asset; battery status information of the asset or the tracking device; service information comprising when a service of the asset is due; asset name comprising the type of asset (e.g. wheelchair, laptop, defibrillator, etc.); a unique identifier (e.g. laptop 1, laptop 2, etc.) of the asset; and the details of a user using the asset, for example the username of a user operating the asset. A relative degree or hierarchy of importance may also be transmitted, for example, a wheelchair might have low importance, whilst a laptop might have high importance. The relative degree or hierarchy of importance may be predetermined, or may be allocated to the asset in use.

In some examples, the information based on the at least one signal and the altitude information is transmitted in response to a request. For example, the request may be sent from a central server managing assets at the facility. The request may be sent on a periodic basis, or only when the location of the asset is desired to be known. The request may be received via the communication interface, for example via a beacon. In examples where the tracking device also comprises a second communication interface, the request may be received via the second communication interface.

Optionally, the tracking device is configured to determine location information. In such examples the information based on the at least one signal and the altitude information transmitted by the tracking device comprises the determined location information. Location information may be information sufficient to be able to locate the asset at the facility, for example relative to a map or plan of the facility. Location information can be, for example, in the form of coordinates or a digital representation of the location. The location information may indicate that the tracking device has been moved, for example to a new floor or a new room.

Determining the location information optionally comprises comparing the received signal and altitude information to one or more of: a virtual plan of the facility; and an expected or stored value. A virtual plan may comprise a map, a floor plan, and/or a comparison of relative positions of features of the facility. Expected or stored values may comprise, for example, values of location information in a look-up table, or a virtual plan of the usual location of asset(s) at the facility. The usual location of assets at the facility may correspond to preselected locations of the assets at the facility, such as where the assets are usually meant to be kept or stored.

The tracking device may also be configured to receive a GPS signal. Determining location information may comprise comparing the information based on the least one signal and/or the altitude information to a GPS signal.

Location information may also be determined by mapping the information based on the at least one signal and the altitude information to a plan, for example a virtual plan. The location information may be adapted (for example by the tracking device) for displaying a position and/or location on the plan, for example, to present to a user, for example at a user device.

In some embodiments, the tracking device further comprises a memory configured to store information based on the at least one signal and the altitude information, such as the location information. In such examples the tracking device may be configured to: (i) transmit one or more stored values of the location information stored in the memory; and/or (ii) detect a change in location of the asset at the facility by comparing the determined location information to the one or more stored values.

In some examples the tracking device may be configured to store information, such as location information, in the memory only when it has changed (for example, by a difference greater than a threshold amount) relative to a previously stored value. A stored value comparison may result in a deduction that the asset has been moved from a stored location, for example wherein a stored value is indicative of: a home/storage location e.g. a "bank", storage facility/room etc., last and/or previously known values of location information, for example, values stored in the memory. Stored values may generally track the location of the asset as it moves, for example between beacons having different unique identifiers, to create a log of the location information, for example with time. The comparison may be performed at the tracking device or at a remote server, such as a security server, and/or at a user device. In some examples the tracking device may be configured to encrypt the information stored in memory.

An activity log may additionally or alternatively be stored in the memory. The activity log may comprise a (e.g. chronological) list of values of location information of the tracking device/asset which may detail a location history of the asset. The tracking device may additionally or alternatively be configured to store a new value of location information and to delete a last or later stored value, for example, to update the current location information of the asset. For example, the tracking device may be configured to store location information only over a recent selected time interval. It will be understood that the tracking device may also be configured to encrypt the activity log.

In some examples the tracking device is coupled to the asset so that the tracking device may be configured control aspects of the operation of the asset—for example the tracking device may control functionality of the asset, and/or components of the asset—such as the power to the asset (and thereby the ability to operate the asset), the a memory of the asset, a microphone, a camera, and/or an interface (such as a USB interface). For example, the tracking device may be incorporated onto the motherboard of the asset if the asset is a computing device or coupled to an M.2 interface of the asset.

Being able to control functionality of the asset may be advantageous as it may deter theft of the asset if the asset is deactivated/destroyed and/or also prevent confidential information being stolen. The tracking device may control the components by way of a physical switch in hardware (such as an FET). The tracking device may additionally or alternatively control access to components of the asset based on the determined location of the tracking device/asset—whether that location is determined locally by the tracking device and/or whether that location is determined remotely such as by the security server.

Optionally, the tracking device may further be configured to determine that the asset is outside a predetermined range and/or leaving the facility based on the at least one signal and the altitude information. In response to determining that the asset is outside a predetermined range and/or leaving the facility, the tracking device may be configured to trigger one or more of: an alert action; a memory wipe action; a self-destruct action; and/or deactivating the asset and/or components of the asset.

The predetermined range may be defined as a range within a selected list of one or more beacons. For example, if the tracking device is out of range of the selected list of beacons, the tracking device may determine that the tracking device is outside the predetermined range. Additionally or alternatively, the tracking device may be configured to determine that the tracking device is out of range if it is in range of one or more selected beacons. For example, the one or more selected beacons may comprise a beacon in proximity to an exit of the facility, and if the asset is in the vicinity of that beacon, the tracking device may determine that the asset is outside the predetermined range and/or leaving the facility. The predetermined range may be determined by a security policy on the security server and/or stored on the tracking device (for example on a memory of the tracking device). The security policy may determine different predetermined ranges depending on the tracking device/asset.

Determining that the asset is outside the predetermine range and/or leaving the facility may trigger one or more of: an alert action; a memory wipe action; a self-destruct action; and/or deactivating the asset and/or components of the asset. It will be understood that the list of selected beacons may be held locally on the tracking device, or remotely, for example on a security server. The list of selected beacons may also be defined by a security policy.

Determining whether the asset is within a predetermined range may comprise checking against a look-up table, or comparing location information to an expected range/value (the expected range/value may also comprise a selected tolerance). This may be performed locally on the tracking device, and/or remotely, for example on a security server. It will be understood that some assets may be designed so as to move around the facility more than others—for example a wheelchair may be designed to move around the facility more than a ultrasound machine. As such, the predetermined range and/or selected tolerance may vary depending on what type of asset the tracking device is attached to.

An alert action may comprise the tracking device emitting a noise/flashing lights/vibrating/heating up and/or triggering a message to be sent, for example to a security server. This may attract attention, for example locally to the asset, for example so that security staff are alerted, and may act as a deterrent for an unauthorised person in possession of the asset.

A self-destruct action and/or a memory wipe action may disable a part of the asset, wherein a part is a memory or a digital feature, for example, a screen or software for controlling the asset, such that the asset cannot be used.

A memory wipe action may be performed on a digital device comprising a memory e.g. a laptop, which may have sensitive or confidential information uploaded thereon. The tracking device performing a memory wipe action comprises applying a voltage to a memory of the asset in voltage pulses. This pulsing of the applied voltage works to destroy the asset without creating an additional problem e.g. fire, melting, significant injury to persons nearby or in contact with the asset.

Deactivating the asset can beneficially prevent unauthorised access or use of an asset. In some examples, components of the asset may be deactivated—such as the memory, a camera or a microphone. This may be a physical deactivation, for example in hardware (such as via a switch such as an FET). It will be understood that the asset or components of the asset may be reactivated if the tracking device determines that it has returned to a predetermined location. In some examples, the tracking device may also comprise a display means to display an indication of the status of the tracking device and to indicate whether components are deactivated or not. For example, the tracking device may comprise a series of LEDS and/or e-paper to provide an indication of whether or not components of the asset are deactivated. Which components of the asset are activated or deactivated may be dictated by a security policy, wherein the security policy defines which components of the asset access is provided to based on the determined location of the tracking device 150/asset 110 and/or the nearest beacon to the tracking device 150/asset 110.

In some examples the tracking device further comprises a motion detector, such as an accelerometer and/or a magnetometer. The motion detector may additionally or alternatively also be configured to determine location information based on satellite signals, such as by way of GPS or Galileo.

The motion detector may be configured to detect a change in location of the tracking device. For example, the motion detector may be configured to detect a movement of the tracking device from a rest position. A motion detector may be used in addition to or instead of the altitude sensor.

In some examples, the tracking device is configured to transmit the received signal and/or altitude information in response to detecting a change in location that is greater than a threshold distance. The threshold distance may be at least 1 m, 5 m, 10 m, 50 m or 100 m.

Optionally, the tracking device is configured to transmit the information based on the at least one signal and the altitude information at determined intervals. In some examples the tracking device is configured to transmit the information based on the at least one signal and the altitude information at determined intervals in response to an event and/or a request. An event which triggers the tracking device to transmit the information based on the at least one signal and the altitude information at determined intervals may be a request for information, movement detection and/or in response to an alert. Determined intervals may comprise once a minute, hour, day, week, etc., depending on the situation. For example, some tracking devices may be configured to transmit one a day or week if the asset is considered not to be in frequent use. In some examples the tracking device may be configured to detect usage of the asset, and determine how frequently it transmits information based on the at least one signal and the altitude information, based on the usage of the asset. For example, the tracking device may transmit information based on the at least one signal and the altitude information at a first (infrequent) interval if the asset is off, in a standby mode and/or has not been moved recently (for example, within a selected time interval), but at a second (more frequent) interval if the asset is on, currently being used and/or has been moved recently (for example, within a selected time interval). Transmitting the information based on the at least one signal and the altitude information at different intervals may help to conserve battery life, if for example the tracking device is powered by a battery.

In some examples, the tracking device is configured to listen for a signal from one or more beacons in range of the tracking device at determined intervals. The determined intervals that the tracking device is configured to listen for a signal from one or more beacons may be the same determined intervals that the tracking device is configured to transmit the information based on the at least one signal and the altitude information.

The tracking device may optionally be configured to receive a signal from the nearby beacon or from another entity in proximity to the tracking device, the signal comprising a message such as an alert message, a wake-up message or an update message. For examples, the signal may be sent from a user device. The signal may be received over the same communication network as the signal from the beacon, or over a different network such as a telecommunications network, such as a GSM network. It will be understood that the messages may be encrypted.

If the signal comprises a wake-up message, the tracking device may be configured to perform a power-up event in response to receiving the wake up message. Power-up of the tracking device may be required so that it can track the asset, for example if the tracking device is enabled with a sleep mode to save battery and/or so that it can receive an update such as a firmware update.

If the signal comprises an update message, in response to receiving the update message, the tracking device may be configured to connect to a network (such as the internet) and perform an update such as a firmware update. For example, the message may indicate that the device needs to connect to a VPN to perform an update e.g. via an internet connection. The update may comprise a security and/or policy update.

In some examples the tracking device is configured to communicate over one or more of: a long-range communication network and a short-range communication network. The communication interface of the tracking device is optionally configured to send and/or receive signals via short-range and/or long-range communication. In some examples the tracking device may comprise separate communication interfaces, for example a first communication interface configured to communicate over a short-range communication network and/or a second communication interface configured to communicate over a long-range communication network. The long-range communication network optionally comprises a telecommunication network (such as a global system for mobile communications, GSM, network), and/or an internet connection. The short-range communication network, for example, optionally comprises Bluetooth®, WiFi®, Zigbee®, and/or infra-red.

Optionally, the tracking device is configured to receive the at least one signal from the beacon via a first communication interface communicating over a first network; and the tracking device is configured to transmit the information based on the at least one signal and the altitude information via a second communication interface communicating on a second network and/or the first network.

In some examples, the first network comprises a short-range communication network, and the second network comprises a long-range communication network. Nearby beacon(s) may communicate with the tracking device via the short-range communication and the tracking device may transmit the information based on the at least one signal and the altitude information via the long-range communication network. In some examples, if one of the networks such as the long-rang communication network is unavailable, the tracking device may be configured to transmit the information based on the at least one signal and the altitude information via a different network, such as via the short-range communication network.

According to a second aspect of the disclosure there is provided a security server for locating a tracking device coupled to an asset to be tracked at a facility. The security server comprises a communication interface, and the security server is configured to obtain beacon information based on at least one beacon in proximity to the asset, and obtain altitude information of the asset. The beacon and altitude information are obtained for use in tracking the asset at the facility. The beacon information may be obtained from one or more beacons, or by a signal transmitted via the tracking device.

The security server may poll tracking devices for this information, for example at selected intervals, or whenever the location of assets to which the tracking devices are attached, is wanted to be known. Additionally or alternatively, the information may be pushed to the security server by the tracking devices, for example at selected intervals and/or whenever a tracking device detects movement, such as movement greater than a selected movement threshold.

In some examples the security server is configured to obtain the beacon information and altitude information from tracking device, and determine the location based on the received beacon and altitude information. In other examples, the security server is configured to receive location information based on beacon information and altitude information from the tracking device.

The security server may act together with the tracking device to track an asset at a facility. Advantageously, the security server can communicate with and track one or more tracking devices. The security server may be a single server or may be distributed amongst a number of servers. It may or may not be located at the facility (or partly on site and partly elsewhere/virtual). The security server may comprise a virtual server.

As noted above, the security server is optionally configured to determine location information of the tracking device at the facility, based on the received beacon and altitude information. The location information may comprise one or more of: a floor number of the facility on which the device is located, a distance of the asset from the nearest beacon or from the beacon from which the signal was received.

The beacon information may comprise, for example, a beacon identifier (such as an SSID), a signal strength of a signal received from a beacon, and/or time of flight of a signal between the tracking device and the at least one beacon. The beacon information may additionally or alternatively comprise information indicative of a status of the beacon—for example if the beacon is operating in a particular mode of operation, and/or if the beacon is operating according to a particular security profile or policy.

The security server optionally further comprises a memory configured to store location information corresponding to one or more tracking devices. In some examples the security server may be configured to store information, such as location information, in the memory only when the location information for that tracking device has changed (for example, by a difference greater than a threshold amount) relative to a previously stored value. A stored value comparison may result in a deduction that the asset has been moved from a stored location, for example wherein a stored value is indicative of: a home/storage location e.g. a "bank", storage facility/room etc., last and/or previously known values of location information, for example, values stored in the memory. Stored values may generally track the location of the asset as it moves, for example between beacons having different unique identifiers, to create a log of the location information, for example with time. The comparison may be performed at the tracking device or at the security server, and/or at a user device. In some examples the security server may be configured to encrypt the information stored in memory.

An activity log may additionally or alternatively be stored in the memory. The activity log may comprise a (e.g. chronological) list of values of location information of the tracking device/asset which may detail a location history of the asset. The security server may additionally or alternatively be configured to store a new value of location information and to delete a last or later stored value, for example, to update the current location information of the asset. For example, the security server may be configured to store location information only over a recent selected time interval. It will be understood that the security server may also be configured to encrypt the activity log.

Optionally, the security server may further be configured to determine that the asset is outside a predetermined range and/or leaving the facility based on the at least one signal and the altitude information. In response to determining that the asset is outside a predetermined range and/or leaving the facility, the security server may be configured to trigger one or more of: an alert action; a memory wipe action; a self-destruct action; and/or deactivating the asset and/or components of the asset.

The predetermined range may be defined as a range within a selected list of one or more beacons. For example, if the tracking device is out of range of the selected list of beacons, the security server may determine that the tracking device is outside the predetermined range. Additionally or alternatively, the security server may be configured to determine that the tracking device is out of range if it is in range of one or more selected beacons. For example, the one or more selected beacons may comprise a beacon in proximity to an exit of the facility, and if the asset is in the vicinity of that beacon, the tracking device may determine that the asset is outside the predetermined range and/or leaving the facility. It will be understood that the list of selected beacons may be held locally on the tracking device, or remotely, for example on the security server.

If it is determined that the asset is outside the predetermine range and/or leaving the facility, the security server may be configured to trigger one or more of: an alert action; a memory wipe action; a self-destruct action; and/or deactivating the asset. The security server may do this by sending a message to the tracking device. The message may be sent over the same communication network over which the security server receives information (such as the beacon and altitude information) from the tracking device, or over a different network.

Determining whether the asset is within a predetermined range may comprise checking against a look-up table, or comparing location information to an expected range/value (the expected range/value may also comprise a selected tolerance). This may be performed locally on the tracking device, and/or remotely, for example on the security server. It will be understood that some assets may be designed so as to move around the facility more than others—for example a wheelchair may be designed to move around the facility more than a ultrasound machine. As such, the predetermined range and/or selected tolerance may vary depending on what type of asset the tracking device is attached to. In some examples the predetermined range and/or selected tolerance may be defined by a security policy, and that security policy may dictate the predetermined ranges for each tracking device/asset in the facility. The security policy may be maintained by the security server. In some examples, the security policy may be sent to the tracking device to also be stored locally on the tracking device.

An alert action may comprise the tracking device emitting a noise/flashing lights/vibrating/heating up and/or triggering a message to be sent, for example to a security server. This may attract attention, for example locally to the asset, for example so that security staff are alerted, and may act as a deterrent for an unauthorised person in possession of the asset.

A self-destruct action and/or a memory wipe action may disable a part of the asset, wherein a part is a memory or a digital feature, for example, a screen or software for controlling the asset, such that the asset (or a part of it) cannot be used.

A memory wipe action may be performed on a digital device comprising a memory e.g. a laptop, which may have sensitive or confidential information uploaded thereon, such as IP addresses. In some examples the memory is an EPROM, and performing a memory wipe action may comprise wiping the data held on the EPROM. The tracking device performing a memory wipe action may comprise applying a voltage to a memory of the asset in a series of voltage pulses. This pulsing of the applied voltage works to destroy the asset without creating an additional problem e.g. fire, melting, significant injury to persons nearby or in contact with the asset.

Deactivating the asset (or parts of it) can beneficially prevent unauthorised access or use of an asset. In some examples, components of the asset may be deactivated—such as the memory, a camera or a microphone. This may be a physical deactivation, for example in hardware. It will be understood that the asset or components of the asset may be reactivated if the tracking device determines that it has returned to a predetermined location. In some examples, the tracking device may also comprise a display means to display an indication of the status of the tracking device and to indicate whether components are deactivated or not. For example, the tracking device may comprise a series of LEDS and/or e-paper to provide an indication of whether or not components of the asset are deactivated.

According to a third aspect of the disclosure there is provided a method of tracking an asset at a facility. The method comprises obtaining at least one signal from at least one beacon in proximity to a tracking device coupled to the asset; obtaining altitude information of the asset; and determining location information of the asset based on the at least one signal and the altitude information.

The signal and altitude information may optionally be transmitted to the security server and/or a user device. The signal and altitude information may be obtained in response to a request e.g. from a user device or from the security server. The at least one signal may comprise information indicative of at least one of: (a) a beacon identifier, (b) a signal strength of the received at least one signal, and (c) time of flight between the tracking device and the at least one beacon. The beacon identifier may comprise information indicative of a status of the beacon—for example if the beacon is operating in a particular mode of operation, and/or if the beacon is operating according to a particular security profile or policy.

In some examples the method may further comprise determining whether the tracking device is outside a predetermined range and/or leaving the facility based on the at least one signal and the altitude information. In response to determining that the asset is outside a predetermined range and/or leaving the facility, the method may comprise triggering one or more of: an alert action; a memory wipe action; a self-destruct action; and/or deactivating the asset.

The predetermined range may be defined as a range within a selected list of one or more beacons. For example, if the tracking device is out of range of the selected list of beacons, it may be determined that the tracking device is outside the predetermined range. Additionally or alternatively, the tracking device may be determined to be out of range if it is in range of one or more selected beacons. For example, the one or more selected beacons may comprise a beacon in proximity to an exit of the facility, and if the asset is in the vicinity of that beacon, the tracking device may determine that the asset is outside the predetermined range and/or leaving the facility. Determining that the asset is outside the predetermine range and/or leaving the facility may trigger one or more of: an alert action; a memory wipe action; a self-destruct action; and/or deactivating the asset. It will be understood that the list of selected beacons may be held locally on the tracking device, or remotely, for example on a security server.

Determining whether the asset is within a predetermined range may comprise checking against a look-up table, or comparing location information to an expected range/value (the expected range/value may also comprise a selected tolerance). This may be performed locally on the tracking device, and/or remotely, for example on a security server. It will be understood that some assets may be designed so as to move around the facility more than others—for example a wheelchair may be designed to move around the facility more than an ultrasound machine. As such, the predetermined range and/or selected tolerance may vary depending on what type of asset the tracking device is attached to.

An alert action may comprise the tracking device emitting a noise/flashing lights/vibrating/heating up and/or triggering a message to be sent, for example to a security server. This may attract attention, for example locally to the asset, for example so that security staff are alerted, and may act as a deterrent for an unauthorised person in possession of the asset.

A self-destruct action and/or a memory wipe action may disable a part of the asset, wherein a part is a memory or a digital feature, for example, a screen or software for controlling the asset, such that the asset cannot be used.

A memory wipe action may be performed on a digital device comprising a memory e.g. a laptop, which may have sensitive or confidential information uploaded thereon. The tracking device performing a memory wipe action comprises applying a voltage to a memory of the asset in voltage pulses. This pulsing of the applied voltage works to destroy the asset without creating an additional problem e.g. fire, melting, significant injury to persons nearby or in contact with the asset.

Deactivating the asset can beneficially prevent unauthorised access or use of an asset In certain examples, the method is performed in response to a request from a user—for example via a program or application running on user equipment, such as a tablet or smart device.

In some examples, the method further comprising receiving, at the tracking device, one or more of: a wake-up message to send information in response to a user request; an update message for updating a security policy.

In some examples the method further optionally comprises determining that the asset and/or the tracking device has been tampered with and sending an alert. For example, tampering may be detected by unusual or localised small motions of the tracking device configured to be recognised as tampering and/or unauthorised access to asset, or wherein motion of the tracking device is uncharacteristically motionless, which may indicate that the tracking device has been removed from the asset. Additionally or alternatively, the motion or determined speed of the tracking device may be indicative of theft—for example, if the beacon and/or altitude information indicate that the tracking device is moving suddenly and/or at a speed above a selected threshold. The method may further comprise disabling access, for example to a memory of the asset, in the event that tampering of the asset is detected.

The method optionally further comprises communicating between the tracking device and a security server over a network comprising one or more of: a long-range communication network; and a short-range communication network. For example, communication between the tracking device and the security server and/or a user device may be via communication interface(s) at the tracking device, the security server and/or the user device.

The method may comprise communication with the tracking device over one or more of: a long-range communication network and a short-range communication network. The long-range communication network optionally comprises a telecommunication network (such as a global system for mobile communications, GSM, network), and/or an internet connection. The short-range communication network, for example, optionally comprises Bluetooth®, WiFi®, Zigbee®, and/or infra-red. In some embodiments, the at least one signal is obtained via the short-range communication network.

Optionally, the method comprises transmitting the information based on the at least one signal and the altitude information at determined intervals. In some examples the method comprises transmitting the information based on the at least one signal and the altitude information at determined intervals in response to an event and/or a request. An event which triggers the tracking device to transmit the information based on the at least one signal and the altitude information at determined intervals may be a request for information, movement detection and/or in response to an alert. Determined intervals may comprise once a minute, hour, day, week, etc., depending on the situation. For example, some tracking devices may be configured to transmit one a day or week if the asset is considered not to be in frequent use. In some examples the method may comprise detecting usage of the asset, and determining how frequently to transmit information based on the at least one signal and the altitude information, based on the usage of the asset. For example, information based on the at least one signal and the altitude information may be transmitted at a first (infrequent) interval if the asset is off, in a standby mode and/or has not been moved recently (for example, within a selected time interval), but at a second (more frequent) interval if the asset is on, currently being used and/or has been moved recently (for example, within a selected time interval). Transmitting the information based on the at least one signal and the altitude information at different intervals may help to conserve battery life, if for example the tracking device is powered by a battery.

In some examples, the method comprises listening for a signal from one or more beacons in range of the tracking device at determined intervals. The method may comprise listening for a signal from one or more beacons at the same determined intervals that the tracking device is configured to listen for may be the same determined intervals that the information based on the at least one signal and the altitude information is transmitted.

The method may also comprise receiving a message such as an alert message, a wake-up message or an update message from a nearby beacon and/or from another entity in proximity to the tracking device. The message may be received over the same communication network as the signal from the beacon, or over a different network such as a telecommunications network, such as a GSM network.

If the message is a wake-up message, this may trigger the tracking device to perform a power-up event in response to receiving the wake up message. Power-up of the tracking device may be required so that it can track the asset, for example if the tracking device is enabled with a sleep mode to save battery.

If the message is an update message, this may trigger the tracking device to connect to a network (such as the internet) and perform an update such as a firmware update. For example, the message may indicate that the device needs to connect to a VPN to perform an update e.g. via an internet connection. The update may comprise a security and/or policy update.

According to a fourth aspect of the disclosure there is provided a non-transitory computer-readable medium storing instructions that, when executed by a processor, perform the method.

System

According to a fifth aspect of the disclosure there is provided a system for tracking an asset at a facility. The system comprises (i) a tracking device for coupling to the asset, the tracking device comprising a communication interface and an altitude sensor; (ii) one or more beacons; and (iii) a security server comprising at least one processor, wherein the security server is in communication with the tracking device and is configured to: obtain, for determining the location of the asset: at least one signal from at least one beacon; and altitude information from the altitude sensor.

The tracking device may be the tracking device having any or all of the features as described above in relation to the first aspect. The security server may be the security server having any or all of the features of the security server as described above in relation to the second aspect. The system may be configured to perform any or all aspects of the method of the third aspect described above.

The system may be configured to determine location information of the tracking device based on the received signal and altitude information.

The system further optionally comprises a user device. The user device may comprise an application or computer program that can be used to prompt the system to track an asset at the facility and/or to provide a user with a tracked location of the asset. The user device may have a communication interface to communication with at least one of the tracking device, the security server and the one or more beacons.

BRIEF DESCRIPTION OF THE DRAWINGS

Exemplary embodiments are illustrated in the accompanying figures in which.

In the drawings, like reference numerals are used to indicate like elements.

DETAILED DESCRIPTION

Figure 1:
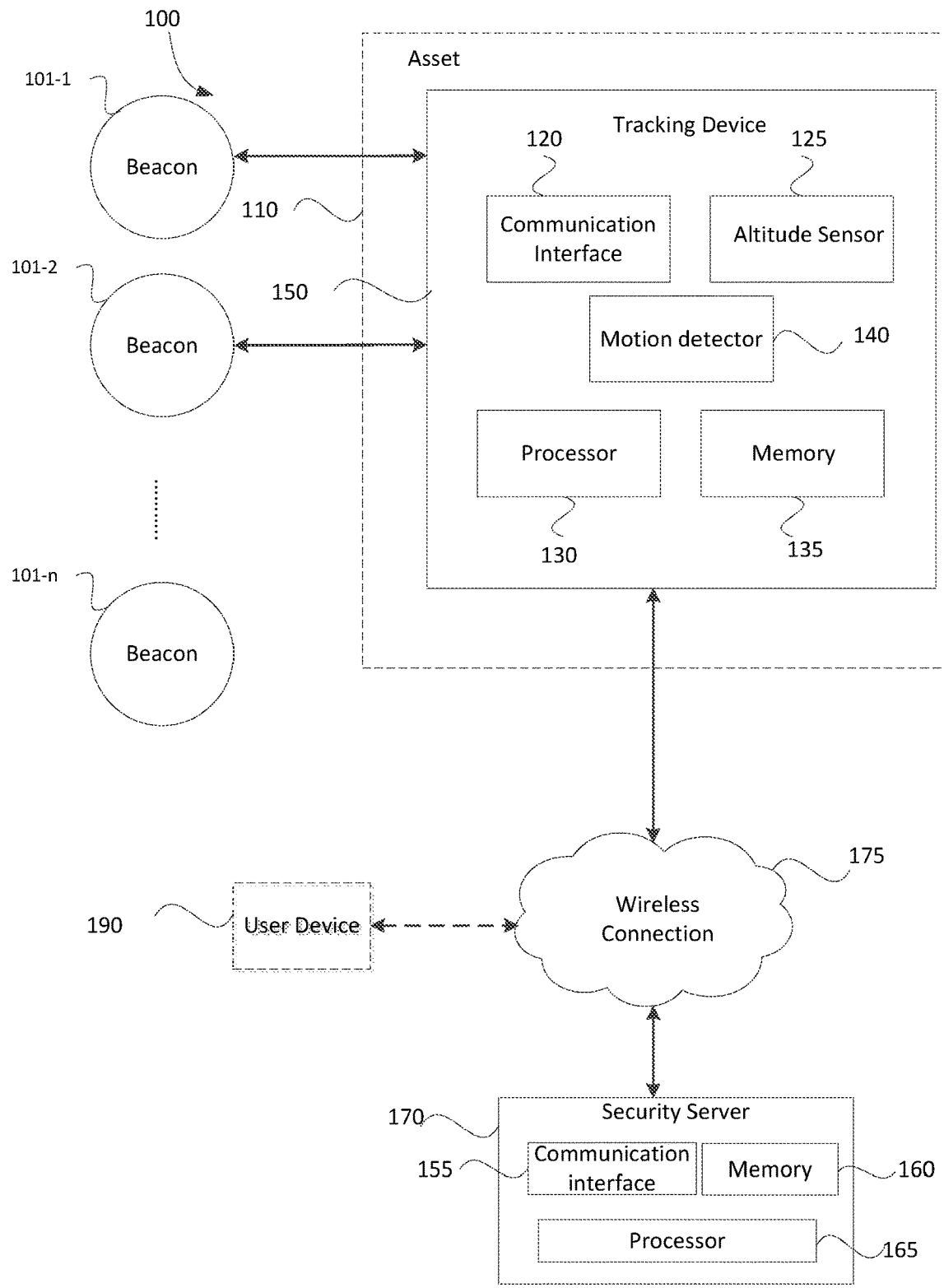
FIG. 1 illustrates an example representation of a system according to an embodiment of the present invention.

FIG. 1 illustrates a system 100 for tracking an asset 110, for example at a facility. The system comprises an asset 110 to be tracked, a tracking device 150 coupled to the asset 110, a security server 170, an optional user device 190 and a plurality of beacons 101-1 to 101-n.

The tracking device 150 is coupled to (for example attached to) the asset 110. For example, the tracking device 150 may be attached to an exterior surface of the asset 110, and/or may be fixed inside the asset 110 for example so that the tracking device 150 is integral to the asset 110. The tracking device 150 may be coupled to the asset 110 by fixing means (e.g. adhesive, using a bolt/screw attachment, by a click-fit ensemble etc.).

In some examples the tracking device 150 is coupled to the asset 110 so that the tracking device 150 may control aspects of the operation of the asset 110—for example the tracking device 150 may control functionality of the asset 151, and/or components of the asset 110—such as the power to the asset 110 (and thereby the ability to operate the asset 110) and/or the memory of the asset (if applicable). This may be advantageous as it may deter theft of the asset if the asset is deactivated/destroyed and/or also prevent confidential information being stolen. The tracking device 150 may control the components by way of a physical switch in hardware (such as an FET). The tracking device 150 may additionally or alternatively control access to components of the asset 110 based on a determined location of the tracking device 150/asset 110. Which components to provide access to based on the determined location may be defined by a security policy.

The asset 110 could be one of a number of devices, for example a medical device in a hospital environment that is mobile and moves around throughout the facility, for example a defibrillator. A non-exhaustive list of other assets, in a hospital environment, might be: a bed, a wheelchair, a heart rate monitor, scanners, general diagnostic/treatment tools or other equipment. This list is not intended to be exhaustive as it will be appreciated that there are a great number of mobile assets within a hospital. It will also be appreciated that the hospital environment is an exemplary environment and that other environments such as schools, offices, factories etc. may also be provisioned with a number of assets that may be required to be tracked and that a similar system might readily be deployed in such an environment. In another example, the asset 110 is a computer, for example a laptop, at an office location.

The tracking device 150 comprises an altitude sensor 125, a communication interface 120, an optional motion detector 140, and a memory 135, all coupled to a processor 130. The communication interface 120 (for example, a radio frequency, RF, interface), altitude sensor 125, memory 135 and motion detector 140 can be controlled by the processor 130 of the tracking device 150. The communication interface 120 may be a short-range communication interface, for example for communicating via Bluetooth® WiFi® and/or ZigBee® communications protocols, and/or a long-range communication interface, for example for communicating via a mobile telecommunications network. In some examples the tracking device 150 may comprise both short and long-range communication interfaces. The motion detector 140 may comprise one or more of a micro-electromechanical, MEMs, sensor a magnetometer and/or an accelerometer.

The security server 170 also comprises a communication interface 155 and a memory 160, both of which are connected to and controlled by a processor 165. The security server 170 may be: virtual or real, central or distributed, located at the facility/not at the facility/part at the facility and part not at the facility.

The optional user device 190 is, for example, a piece of user equipment such as a mobile phone, a tablet, a desktop computer and/or a laptop computer. The user device 190 comprises a communication interface (for example, a radio frequency, RF, interface), an input means such as a touch screen, keyboard and/or mouse, and a display means, for requesting and/or viewing location(s) of the asset 10 to which the tracking device 100 is coupled. It will be understood that in some examples the system 100 may comprise a plurality of user devices 190. The communication interface may be a short-range communication interface, for example for communicating via Bluetooth® WiFi® and/or ZigBee® communications protocols, and/or a long-range communication interface, for example for communicating via a mobile telecommunications network. In some examples the user device 190 may comprise both short and long-range communication interfaces.

Beacons 101-1 to 101-*n* are distributed throughout the facility in fixed and/or known locations. The beacons 101-1 to 101-*n* may be distributed about a facility in a number of locations. They may be dispersed throughout the facility such that they cover the entire footprint of the facility in which they are placed. Beacons 101-1 to 101-*n* may be identifiable by a beacon identifier, which can be a unique identifier to each of the one or more beacons 101-1 to 101-*n*. The beacons 101-1 to 101-*n* could have independent coverage areas or overlapping coverage areas (for example, they may form a mesh network), or some mixture of overlapping and individual throughout the facility.

Each beacon 101-1 to 101-*n* comprises a communication interface (for example a radio frequency, RF, interface). In some examples the communication interface 120 comprises a short-range communication interface for example for communicating via Bluetooth® WiFi® and/or ZigBee® communications protocols, and/or a long range communication interface for example for communicating via a mobile telecommunications network, and/or may comprise an interface for each network that the tracking device is configured to communicate with.

The system 100 is configured to determine a location of the asset 110 at the facility. The location information is determined based on information received from at least one beacon 101-*n* and altitude information. An asset 110 is provided with the tracking device 150 such that it can be tracked.

The tracking device's communication interface 120 may be configured to receive a signal containing information from at least one beacon 101-1 to 101-*n* (such as the closest beacon 101-1). The signal received from the beacon 101-1 may contain information comprising a reference to a unique identifier of the beacon 101-1. If the location of the beacon is known, the unique identifier of the beacon can be used to determine the location of the asset 110. Additionally or alternatively, the beacon 101-1 may transmit its location, for example as a set of coordinates, to the communication interface 120 at the tracking device 150.

In some examples the tracking device 150 may be configured to additionally or alternatively determine a time of flight and/or a signal strength of the signal received from the at least one beacon 101-*n*. For example, the tracking device 150 may be configured to transmit information based on the at least one signal and the altitude information when: (i) the signal strength of the received at least one signal is greater than a signal strength threshold; and/or (ii) the time of flight is greater than a time of flight threshold. Additionally or alternatively, the information based on the at least one signal and the altitude information may be transmitted in response to a user request.

The tracking device's altitude sensor 125 is configured to obtain altitude information or determine relative changes of the altitude of the tracking device 150. The altitude sensor 125 may be configured to measure relative altitude, for example relative to other tracking devices 150 and/or beacons 101-*n* within the facility/relative to a rest position (e.g. if the asset 110 is picked up), rather than directly measuring the height at which it is located. The altitude information provided by the altitude sensor 125 could be indicative of height of the asset 110 on which the tracking device 125 is attached to, which can be translated, within the facility, to a floor number (e.g. ground floor, first floor . . . etc.).

The tracking device's processor 130 is arranged to operate and facilitate the function of the tracking device 150. The processor 130 at the tracking device 150 on the asset 110 can process data such as data relating to information based on the location of the closest beacon 101-1 and altitude data collected by the altitude sensor 125, and in some examples may use the information to determine location information of the asset 110. Determining location information may comprise comparing the received signal and altitude information to one or more of a virtual plan of the facility and an expected or stored value.

The tracking device 150 is configured to receive, via the communication interface 120, at least one signal from the at least one beacon 101-*n*, and receive, via the altitude sensor 125, altitude information. The tracking device 150 is configured to transmit, for use in tracking the asset at the facility, information based on the at least one signal and the altitude information.

The tracking device's memory 135 is configured to store, for example, location information, e.g. coordinates of the tracking device 150, values of the altitude, details of past communications etc. The tracking device 150 may be configured to transmit one or more stored values of the location information stored in the memory and/or detect a change in location of the asset at the facility by comparing the determined location information to the one or more stored values.

It will be understood that in some examples the tracking device 150 may not determine the location itself but may instead send information based on a signal from the at least one beacon 101-n and the altitude information, for example to the security server 170, for determining the location of the tracking device 150. It will also be understood that the security server 170 may also be configured to determine a time of flight and/or a signal strength of the signal received from the at least one beacon 101-n.

In some examples the tracking device 150 may be configured to determine whether or not the asset is outside a predetermined range based on the at least one signal and the altitude information; and in the event that the tracking device 150 is determined to be outside the predetermine range, trigger one or more of: an alert action; a memory wipe action (for example, by erasing data contained on a memory of the asset); a self-destruct action; and/or deactivating the asset. It will also be understood that additionally or alternatively the security server 170 may be configured to determine whether or not the asset is outside a predetermined range based on the at least one signal and the altitude information; and in the event that the tracking device 150 is determined to be outside the predetermine range, trigger one or more of: an alert action; a memory wipe action (for example, by erasing data contained on a memory of the asset); a self-destruct action; and/or deactivating the asset. The security server 170 may trigger one or more of these actions by sending a signal comprising a message to the tracking device 150 and/or a signal directly to the asset 110.

The optional motion detector 140 of the tracking device 150 is configured to detect movement of the tracking device, for example, if motion of the tracking device 150 exceeds a predetermined threshold, for example an acceleration and/or speed threshold. The tracking device 150 may be configured to transmit the received signal and/or altitude information in response to detecting a change in location (for example by comparison with a previously-stored location in memory, via a change in altitude indication by the altitude sensor, a change in location relative to a beacon 101-n and/or movement detected by the motion detector 140) that is greater than a threshold amount.

It will be understood that the tracking device 150 may additionally or alternatively be configured to transmit the received signal and/or altitude information at determined intervals and/or in response to a request (i.e. a poll) for information received from the security server 170.

Beacons 101-1 to 101-n are configured to transmit and/or receive information within a short range via, for example, a short-range communication interface. The range of the beacon is finite and configured to operate within a specified area, for example a cell. For example, beacons 101-1 to 101-n may have a range of approximately 70 meters, or even up to 450 meters. The range of a beacon 101-n depends somewhat on the environment the beacon 101-n is placed in and any obstacles which may interfere with the signal, such as walls and structural features of the facility. A beacon 101-n is configured to broadcast information within its vicinity, to, for example, other devices within range of the beacon 101-n. For example, a beacon 101-n communicates with the communication interface 120 at the tracking device 150 on the asset 110.

Communications may also be provisioned directly between the tracking device 150 and the user device 190 although this is not illustrated in FIG. 1. In some examples some of the functionality of the user device 190 may additionally or alternatively be provided by the security server 170, for example, so that a user can instruct the security server 170 through hardware, such as a user interface. For example, the security server 170 may comprise a display and input means for displaying a user interface for the user to interact with.

In examples where the tracking device 150 has more than one communication interface 120, the tracking device 150 may be configured to receive the at least one signal over a first network via a first communication interface (for example, a short-range communication interface), and transmit the information based on the at least one signal and the altitude information on a second network (for example, a long-range communication interface), that is different to the first network.

The security server 170 may be a central device, for example a computer or a server, from which tracking to find an asset 110, may be initiated. The security server 170 is configured to communicate, via the communication interface 155, between various devices, such as the tracking device 150 and the user device 190. Communications may comprise requests for information or provision of information to the one or more devices of the system 100 with which communication is possible. The security server 170 may be configured to distribute messages throughout the system 100, for example, in order to find and/or trigger an event at the tracking device 150.

The security server 170 is configured to obtain beacon information based on at least one beacon in proximity to the asset 110, and obtain altitude information of the asset 110. The beacon and altitude information are obtained for use in tracking the asset 110 at the facility. The security server 170 may be configured to determine location information from the obtained beacon information and the altitude information, or may already receive location information based on the beacon information and the altitude information from the tracking device 150.

In some examples the security server 170 is further configured to determine that the asset 110 is outside a predetermined range based on the at least one signal and the altitude information, and transmit a signal to the tracking device 110 configured to trigger one or more of: an alert action; a memory wipe action; a self-destruct action; and/or deactivating the asset 110.

In some examples the security server 170 is configured to communicate with the tracking device to prompt the tracking device to transmit information for use in tracking the asset at the facility, such as information based on beacon(s) 101-n in proximity to the tracking device 150 and the altitude of the tracking device 150.

The user device 190, if included in the system, is arranged to communicate with the tracking device 150, for example, via the security server 170 over a wireless communication 175. The communication interface may be configured to communicate with the tracking device 150 and/or the security server 170. A user can make requests concerning the location of the asset, for example, via a user interface at the user device 190, and/or view asset locations. The communication interface 180 is configured to transmit and receive a request for and corresponding reply containing information concerning location of the asset 110. Communications may be made between the user device 190 and the security server 170 and/or the tracking device 150 over a wireless connection 175 and/or a wired connection.

In use, the communication interface 120 of the tracking device 150 listens to signals from nearby beacons 101-*n*. The tracking device 150 may be configured to poll nearby beacons for a signal, or the beacons 101-*n* may periodically send/broadcast signals which the communication interface 120 of the tracking device 150 can receive. The signals comprise at least one of: (a) a beacon identifier, (b) a signal strength of the received at least one signal, and (c) time of flight between the tracking device 150 and the at least one beacon 101-*n*.

The altitude sensor 125 also senses the altitude of the tracking device 150. The tracking device 150 transmits, for use in tracking the asset 110, information based on the at least one signal (from the beacon(s) 101-*n*) and altitude information from the altitude sensor 125.

According to one example, the tracking device 150 may be configured to automatically track the asset 110. For example, the tracking device 150 may determine the location of the asset 110 based on the at least one signal and the altitude information, and monitor the location of the asset 110 in relation to a predetermined range. In the event that the tracking device 150 determines that the asset 110 has left the boundaries of the pre-determined range, the tracking device 150 may be configured to take action, for example by triggering an event. The event may include at least one of an alert action, a memory wipe action, a self-destruct action, and/or deactivating the asset.

According to another example, the security server 170 may be configured to automatically track the asset 110. For example, the tracking device 170 may determine the location of the asset 110 based on the at least one signal and the altitude information received from the tracking device 150, and monitor the location of the asset 110 in relation to a predetermined range. In the event that the security server 170 determines that the asset 110 has left the boundaries of the pre-determined range, the security server 170 may be configured to take action, for example by triggering an event. Triggering an event may comprise sending a message to the tracking device 150 that causes the tracking device 150 to perform a particular action. The event may include at least one of an alert action, a memory wipe action, a self-destruct action, and/or deactivating the asset.

According to another example, the tracking device 150 tracks the location of the asset 110, in response to a request. The request may be made, for example, by the security server 170 and/or by a user device 190. The request comprises a message being sent, for example via wireless connection 175, from at least one of the user device 190 and the security server 170, to the tracking device 150. For example, the message may be sent from the communication interface 155 of the security server 170, over the wireless connection 175, and received by the communication interface 120 of the tracking device 150. The message may prompt the tracking device 150 to obtain at least one signal from a beacon 101-*n* in proximity to the tracking device 150, and obtain altitude information from the altitude sensor 125. However, it will be understood that in other examples the tracking device 150 may already have recent information relating to the beacon (i.e. a recently received signal from at least one beacon 101-*n*) and recent altitude information (for example, information received within a selected time window) stored in memory 135 and therefore the message may not prompt the tracking device 150 to obtain new information.

The message prompts the tracking device 150 to transmit, for use in tracking the asset 110 at the facility, information based on the at least one signal and the altitude information. In some examples the message may prompt the tracking device 150 to transmit a determined location of the tracking device 150, determined by the tracking device 150 based on the at least one signal and the altitude information. The tracking device 150 may transmit this information to the security server 170 via wireless connection 175, to the user device 190 directly via the wireless connection 175, or to the user device via the security server 170 via the wireless connection 175.

In some examples, requests for location information may be processed and handled by the security server 170. The security server 170 may keep a record of which tracking device 150 is coupled to which asset 110, so that the security server 170 can direct a request to the correct tracking device 150.

For example, a request for information relating to the location of the asset 110 may be made by the user device 190, sent to the security server 170 via the wireless connection 175, and then from the security server 170 to the tracking device 150. The request may be received by the communication interface 120 of the tracking device 150. The security server 170 may then receive information back from the tracking device 150 and in some examples may process that information (for example, by determining a location of the asset 110 based on the at least one signal and the altitude information and knowledge of which asset 110 the tracking device 150 is coupled to) before sending information on to the user device 190 via the wireless connection 175.

It will be understood that in the context of the examples described above that the wireless connection 175 is only an example of a communication network which the user device 190, security server 170 and tracking device 150 may communicate with each over. It will of course be understood that the user device 190, security server 170 and tracking device 150 may communicate with each over a plurality of communication networks, wired and/or wireless, for example radio frequency, RF, networks, such as a long-range communication network and a short-range communication network. For example, the user device 190, security server 170 and tracking device 150 may communicate with each over a telecommunications network, such as a digital cellular network, for example GSM or 2G, 3G, 4G and/or 5G network.

It will of course also be understood that the examples described above may be combined with each other, so that the tracking device 150 may be configured to monitor location in relation to a predetermined range and to track the location of the asset 110 via a request from a user. For example, the tracking device 150 may be configured to monitor the location of the asset 150 in relation to a predetermined range at selected intervals and/or only if movement of the tracking device 150 is detected (for example by optional motion detector 140), but if a more recent/up-to-date location of the asset 110 is desired, a request can be sent to the tracking device 150 for more recent information.

A location of the tracking device 150 (and thereby the asset 110 to which it is attached) may be determined with reference to a building/facility floor-plan and may be accurate to within the range of the beacon 101-1 from which the tracking device 150 receives a signal. A memory 135 located at the tracking device and/or a memory 160 located at the security server, stores the location of one or more tracking device(s) 150. Locations of one or more tracking device(s) 150 (and the asset(s) 110 to which they are coupled) may be stored in a look-up table or the like, and the memory 160 at the security server 170 can be configured to store a historical and chronological location of a tracking device 150 in the past, or recent past. The memory may also be configured to overwrite a location of a tracking device 150 if it changes by more than a selected threshold compared to a previously stored value. In this way, the location of the tracking device 150 is only stored in memory if it has changed.

Figure 2:
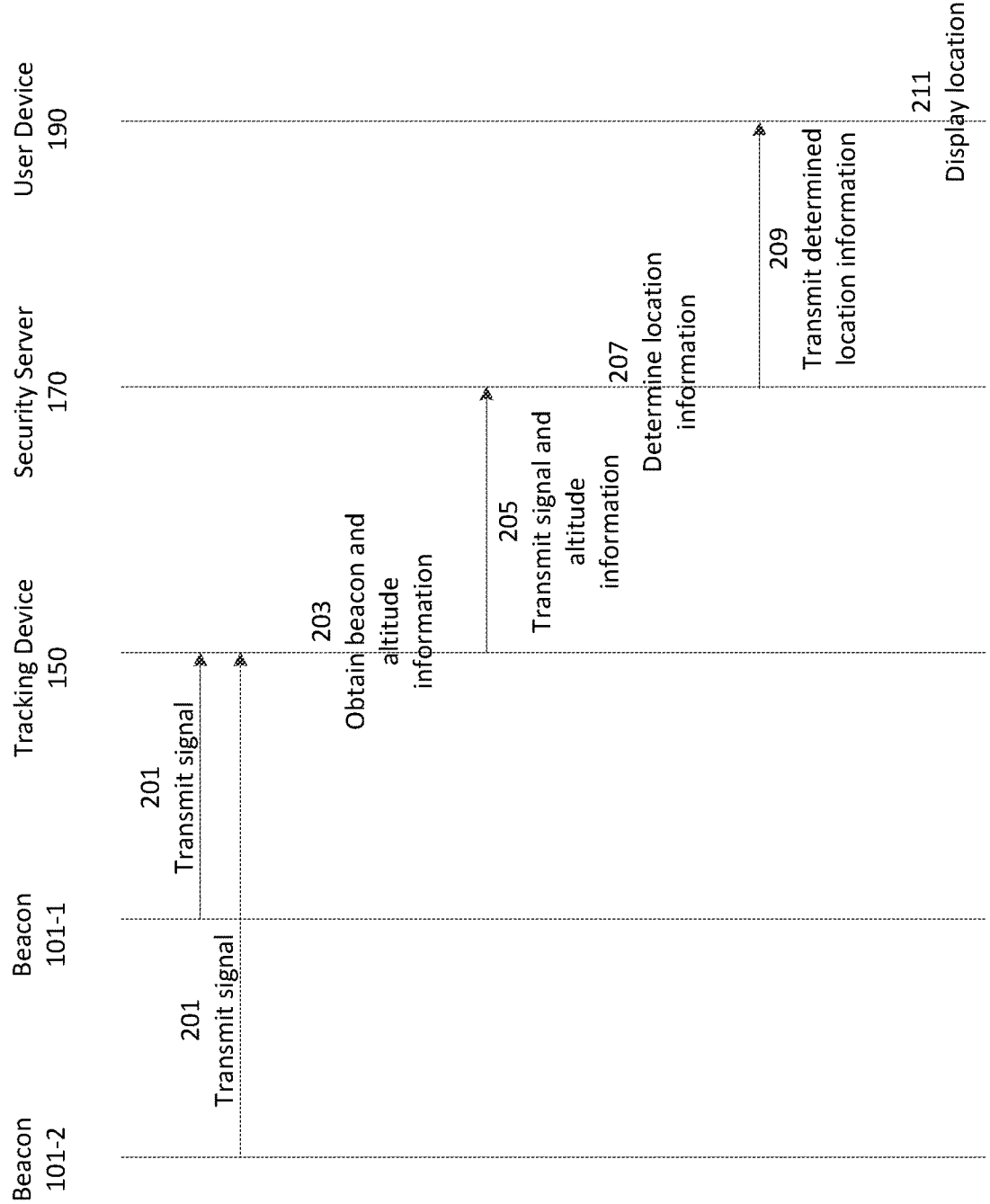
FIG. 2 is a sequence diagram of an example method of tracking the location of an asset at a facility.

FIG. 2 is a sequence diagram of an example method of tracking the location of an asset at a facility.

According to a first step, beacons 101-1, 101-2 that are within range of the tracking device 150 transmit 201 respective signals to the tracking device 150. The tracking device 150 obtains 203 respective signals from the nearby beacons 101-1, 101-2 and altitude information from altitude sensor 125. The tracking device 150 may obtain this information in response to a user input, or for example, the tracking device 150 may be configured to obtain the information at selected intervals or in response to an event, for example if the optional motion detector 140 detects that the tracking device 150 is being moved.

The tracking device 150 then transmits 205 the received beacon and altitude information are transmitted to the security server 170. The beacon and/or altitude information received at the tracking device 150 may be sent together (for example in the same message) or separately (for example, in respective messages) to the security server 170. For example, the tracking device 150 may be configured to transmit the information it receives to the security server 170 immediately upon it having been received via the communication interface 120 of the tracking device 150.

Upon receiving the signal and altitude information from the tracking device 150, the security server 170 determines the location of the asset 110. The security server 170 does this by using the beacon information provided by the signals received from the beacons 101-1, 101-2, and the altitude information to derive a location of the asset 110 at the facility. The security server 170 may do this by comparing the beacon information provided by the signals received from the beacons 101-1, 101-2, and the altitude information, to a lookup table or a plan or map of the facility.

Optionally, the determined location is transmitted 209 to a user device 190, where the location of the asset can be displayed 211, for example, on a display/screen at the user device 190.

Although not shown in FIG. 2, it will be understood that in some examples the tracking device 150 may be configured to perform the step of determining the location of the tracking device 150. The location information may then be sent either to the security server 170 or to the user device 190.

It will also be understood that the tracking device 150 may receive a signal from the beacon(s) 101-n over a first network, such as a short-range communication network (for example Wi-Fi®, Bluetooth®, ZigBee®), and then transmit 205 the signal and altitude information to the security server 170 over a second network, such as a long-range communication network (for example, a mobile telecommunication network). It will also be understood that the security server 170 may transmit 209 determined location information to the user device 190 via the first network, the second network and/or a third network.

Figure 3:
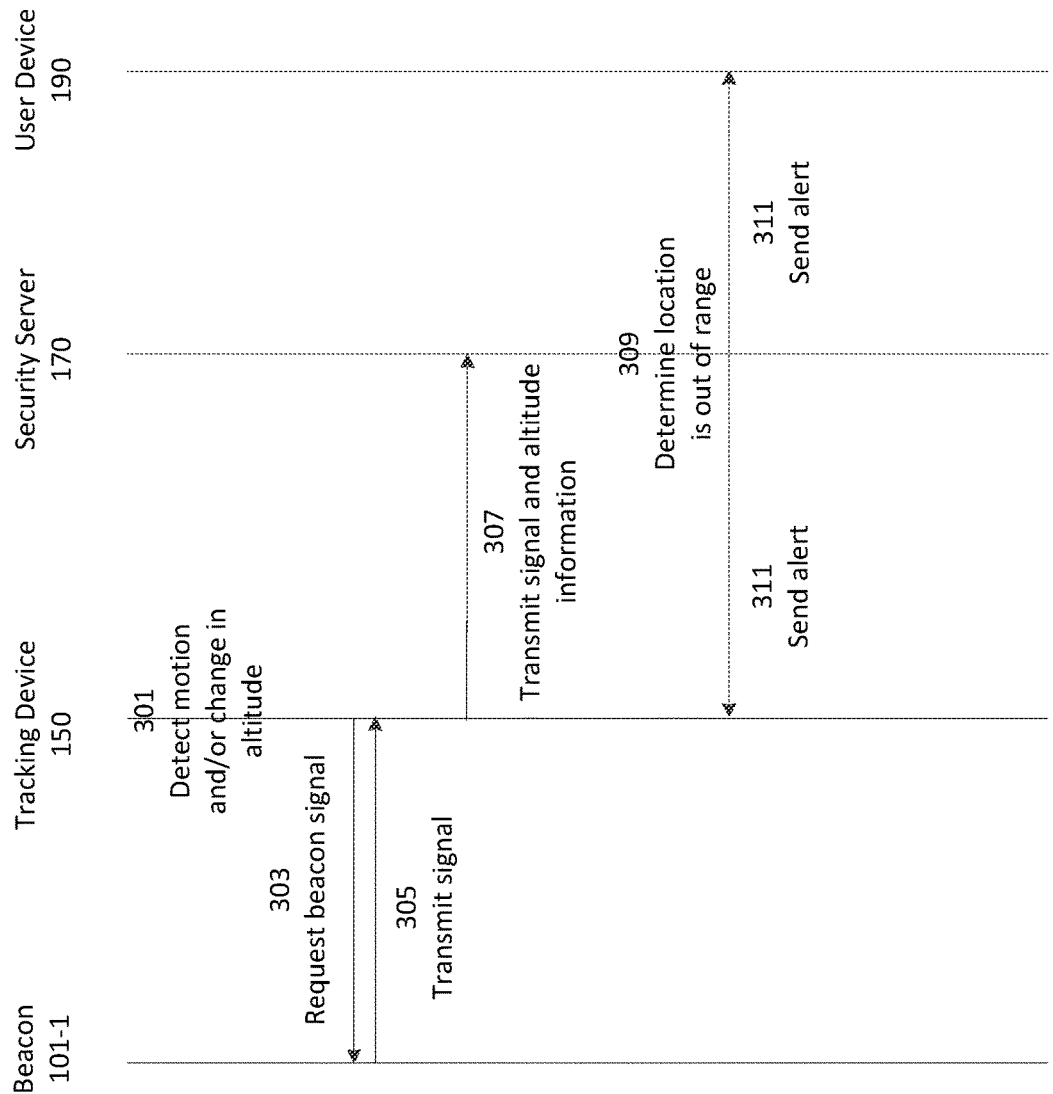
FIG. 3 is a sequence diagram of an example method of tracking the location of an asset at a facility.

FIG. 3 is a sequence diagram of another example method of tracking the location of an asset at a facility, and shows what happens when it is determined that the tracking device 150 is out of a predetermined range.

The tracking device 150 detects 301 a motion and/or a change in altitude. The motion may be detected by optional motion detector 140. Additionally or alternatively, the motion may be detected by a change in altitude indicated by the altitude sensor 125.

The detection of the motion triggers the tracking device 150 to request 303 a signal from at least one nearby beacon 101-1. The tracking device 150 may request a signal from a beacon 101-1 by individually addressing it, or may be configured to broadcast a request and listen for any replies.

A nearby beacon 101-1 transmits 305 a signal to the tracking device 150 in response to receiving the request from the tracking device 150. The signal received from the beacon 101-1 provides information relating to its location at the facility. For example, the beacon 101-1 may be located at a known position at the facility, and the signal received from the beacon 101-1 can be used to determine the position of the tracking device 150 relative to the beacon and, along with the altitude information, the relative position of the tracking device 150 in the facility.

It will be understood that in some examples the tracking device 150 may be configured to continually request beacon signals from nearby beacons if the tracking device 150 is still being moved.

The tracking device 150 then transmits 307 information based on the at least one signal (for example comprising beacon information) and altitude information to the security server 170.

The tracking device 150 can be configured to transmit information at determined intervals or in response to a further change. A further change may comprise the signal being received from a different nearby beacon 101-n, which can be indicative of the direction in which the asset is being moved, for example in a horizontal plane. Further changes may alternatively comprise a change in altitude over a threshold amount, for example wherein a threshold amount distinguishes between an asset 110 being picked up and going down/up floor/floors at the facility.

The security server 170 then makes a determination as to the location of the asset 110 (to which the tracking device 150 is coupled) based on the at least one signal and altitude information transmitted to it by the tracking device 150. The security server 170 compares the location to a predetermined range (which may be dictated by a security policy for that tracking device 150/asset 110). The predetermined range can be specific to an asset to which the tracking device 150 is coupled and provides an area, which may be a three dimensional area, within which the asset is expected to remain.

There may be different levels of range, for example, that specifies degree of warning within certain zones, such as from safe—low—medium—high warning level zones. The zones may be defined by a security policy on the security server and/or stored on the tracking device (for example on a memory of the tracking device), and the security policy may be unique to that tracking device 150/asset 110. The security policy may also define which components of the asset 110 are enabled/disabled based on the determined location of the tracking device 150/asset. Which zone the tracking device 150/asset 110 is in may be defined based on the beacon 101-n closest to the tracking device 150/asset 110.

A safe zone may comprise an expected location, for example a room of a hospital the asset 110 is usually in/is expected to be in. Low warning zones may surround the expected location, for example a ward or unit that the asset 110 is expected to be in and that is ok to be found at. Medium zones indicate that the asset 110 is in a location that is deemed acceptable, although not preferable, but that could lead to the asset 110 being moved into a high level zone. Medium warning zones could cover the rest of the facility outside the safe—low zones, for example. High warning zones might therefore be outside the facility or in particular restricted zones within the facility (such as in proximity to an entrance/exit of the facility) where the asset 110 is not permitted to be, and where immediate action to retrieve or stop the asset 110 being moved are required.

It will be understood that in some examples the beacons 101-n may be configured to transmit information indicating which zone they are in as part of the beacon identifier sent to the tracking device 150. However, it will also be understood that the tracking device 150 and/or security server 170 may be configured to determine which zone the tracking device 150 is in based on a lookup operation by looking up information based on the signal received from the at least one beacon (such as the beacon identifier) in a table listing the selected zone or zones ascribed to each beacon 101-n.

In some examples, the tracking device 150 may be configured to control functionality of the asset 110 (for example, functionality of components of the asset 110) based on the determined zone the asset 110 is in. For example, the tracking device 150 may be configured to provide access to all components of the asset 110 when the tracking device 150 is in a safe zone, but (temporarily) disable functionality of a component, such as a microphone or camera, when the tracking device 150 is determined to be in a low, medium and/or high warning level zone. More components may be disabled or re-enabled depending on the determined zone. The tracking device 150 may be configured to control functionality of the asset 110 by way of a physical switch (i.e. in hardware).

If it is determined 309 that the asset is outside the predetermine range, the security server 170 sends 311 an alert to one or both of the tracking device 150 and the user device 190. The alert may be a signal or message which may include a degree severity indicating that the asset 110 is in a warning zone from between a safe zone to a high warning zone. In other examples, the alert may comprise a command to perform an action at the tracking device 150.

The user operating the user device 190 may be presented with one or more options following the alert, from which a user can select a subsequent action. The subsequent action may comprise performing an action at the tracking device 150 (such as disabling access to the asset 110 and/or components of the asset 110), for example. In other examples, the user might contact a member of staff, for example security staff, in response to receiving the alert. The subsequent action may comprise a signal being sent from the user device 190, either directly to the tracking device 150 or indirectly via the security server 170. The signal may comprise a message such as an alert message, a wake-up message or an update message.

It will also be understood that in some examples determining 309 the location of the tracking device 150 and the sending 311 of an alert may additionally or alternatively be performed by the tracking device 150.

Figure 4:
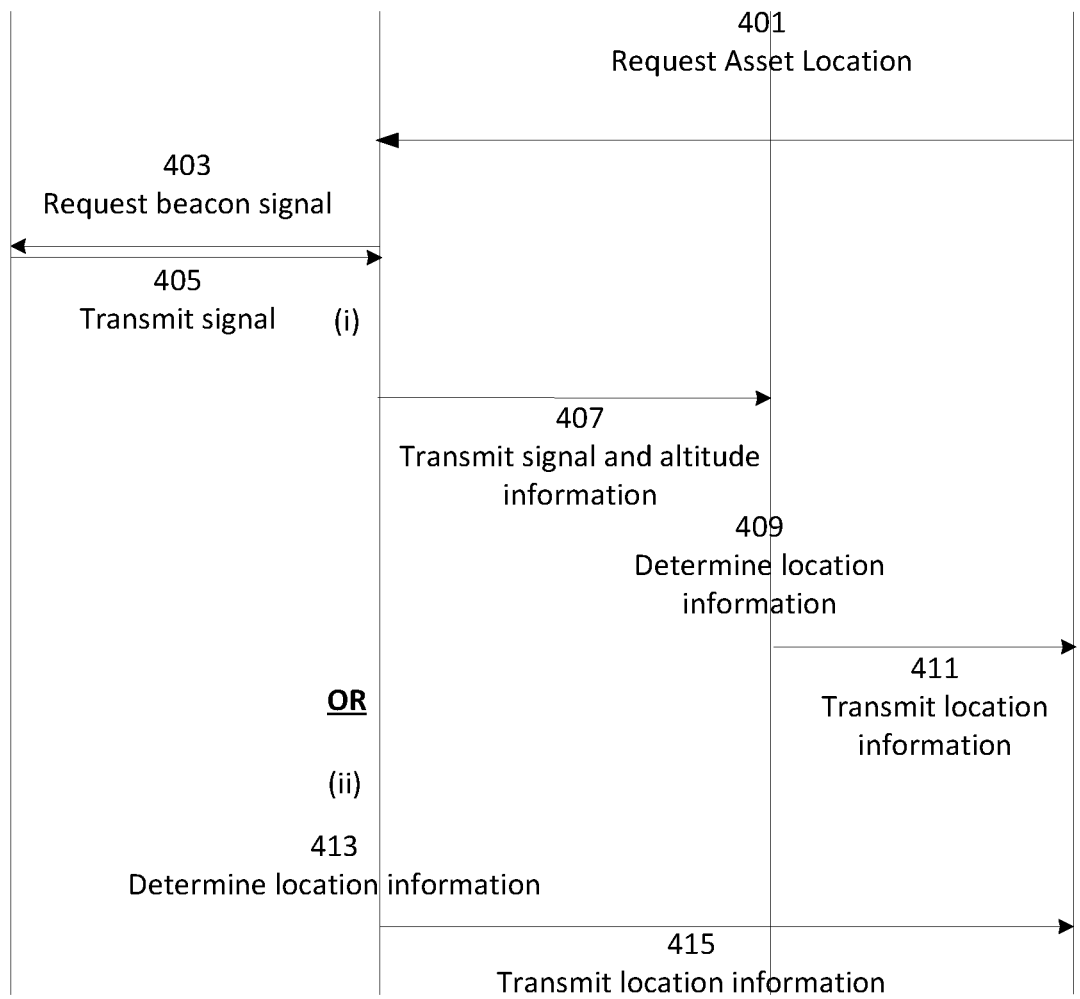
FIG. 4 is a sequence diagram of an example method of tracking the location of an asset at a facility.

FIG. 4 is a sequence diagram of an example method of tracking the location of an asset at a facility.

A user requests 401 asset location information from a user device 190. The request is sent to the tracking device 150. A user may request asset location information, for example, if the asset generally is a moveable asset, such as a computer or hand-held device, that is used frequently in different locations throughout the facility and the user does not know the location of the asset or it is not in an expected location.

In response to receiving the request for asset location information, the tracking device 150 requests 403 a signal from a nearby beacon 101-1. In return, the nearby beacon 101-1 replies 405 by transmitting a signal to the tracking device 150.

Depending on the capabilities of the tracking device 150, the following alterative procedures occur:

According to a first option (i) the tracking device 150 transmits 407 the signal and altitude information to the security server 170. The security server 170 determines 409 location information based on the received signal and altitude information and transmits 411 the location information to the user device 190.

According to a second option (ii) the tracking device 150 determines 413 the location information locally from the beacon signal and altitude information, and transmits 415 the location information directly to the user device 190.

Although not shown in FIG. 4, the request 401 for asset location information may optionally be sent via a security server 170 before being forwarded to the tracking device 150.

While embodiments of the disclosure relate to tracking an asset at a facility, it will be understood that the tracking device, security server and method described herein may also be used for tracking assets elsewhere. For example, the facility may not be limited to being a building. In some examples, the facility may be an outdoor area such as a park or outdoor activity centre.

In addition, while embodiments of the disclosure describe the use of an altitude sensor 125, it will be understood that such a feature is not essential. For example, the tracking device 150 may be configured to operate using only information based on beacon information and/or information from a motion detector 140. For example, the tracking device 150 may be configured to receive via the communication interface 120, at least one signal from the at least one beacon 101-n; receive, via a motion detector 140, motion information; and wherein the tracking device 150 is configured to transmit, for use in tracking the asset 110 at the facility, information based on the at least one signal and the motion information.

It will also be understood that while the tracking device 150 described above has been described with reference to an asset 110, the tracking device 150 and/or its functionality may be incorporated into one or more of the beacons 101-n. For example, one or more beacons may be configured to receive, via an altitude sensor, altitude information, via a motion detector, motion information, and wherein the beacon 101-n is configured to transmit, for use in tracking the location of the beacon 101-n at the facility, information based on the altitude and motion information. The motion information may comprise detects changes in movement based on accelerometer/magnetometer signals, and/or satellite information e.g. GPS signals. As with the tracking device 150 described above, in some examples the beacon(s) 101-n and/or functionality of the beacon(s) 101-n may be controlled locally and/or by the security server 170, for example based on information based on the altitude and motion information, and/or a security policy.

The tracking device 150 described above may also comprise an anti-tamper detector. In such examples, the tracking device 150 may be configured to transmit a signal to the security server 170 if the anti-tamper detector detects the tracking device 150 is being tampered with. In response to receiving this signal, the security server 170 may be configured to trigger one or more of: an alert action; a memory wipe action; a self-destruct action; and/or deactivating the asset 110 and/or components of the asset 110, as described above. Additionally or alternatively, the tracking device 150 may be configured to locally trigger, in response to the anti-tamper detector detecting tampering, one or more of: an alert action; a memory wipe action; a self-destruct action; and/or deactivating the asset 110 and/or components of the asset 110, as described above.

It will be appreciated from the above description that many features of the different examples are interchangeable and combinable. The disclosure extends to further examples comprising features from different examples combined together in ways not specifically mentioned. Indeed, there are many features presented in the above examples and it will be apparent to the skilled person that these may be advantageously combined with one another.

The invention claimed is:

1. A tracking device for tracking an asset at a facility, the tracking device comprising:
   a communication interface configured to communicate with at least one beacon in proximity to the tracking device;
   an altitude sensor; and
   wherein the tracking device is configured to:
      receive, via the communication interface, at least one signal from the at least one beacon;
      receive, via the altitude sensor, altitude information; and
      wherein the tracking device is configured to transmit, for use in tracking the asset at the facility, information based on the at least one signal and the altitude information,
      wherein the tracking device is configured to determine whether the asset is outside a predetermined range based on the at least one signal and the altitude information;
      wherein, in response to the asset being determined to be outside the predetermined range, the tracking device is configured to trigger deactivating components of the asset; and
      in response to the asset being determined to return to be within the predetermined range, the tracking device is configured to trigger reactivating components of the asset.

2. The tracking device of claim 1, wherein the at least one signal comprises at least one of:
   (a) a beacon identifier, (b) a signal strength of the received at least one signal, and (c) time of flight between the tracking device and the at least one beacon.

3. The tracking device of claim 2, wherein the tracking device is configured to transmit the information when:
   (i) the signal strength of the received at least one signal is greater than a signal strength threshold; and/or
   (ii) the time of flight is greater than a time of flight threshold.

4. The tracking device of claim 1 wherein the tracking device is configured to transmit the information based on the at least one signal and the altitude information in response to a user request.

5. The tracking device of claim 1 wherein the tracking device is configured to determine location information based on the at least one signal from the at least one beacon and the altitude information, and wherein the information based on the at least one signal and the altitude information transmitted by the tracking device comprises the determined location information.

6. The tracking device of claim 5, wherein determining the location information comprises comparing the received signal and altitude information to one or more of:
   a virtual plan of the
   facility; and an
   expected or stored
   value.

7. The tracking device of claim 5, further comprising a memory configured to store one or more values of the location information;
   wherein the tracking device is configured to:
   (i) transmit one or more stored values of the location information stored in the memory; and/or
   (ii) detect a change in location of the asset at the facility by comparing the determined location information to the one or more stored values.

8. The tracking device of claim 1 further comprising:
   determining that the asset is outside a predetermined range based on the at least one
   signal and the altitude
      information; and triggering
      one or more of:
   an alert action;
   a memory wipe action;
   a self-destruct action; and/or
   deactivating the asset.

9. The tracking device of claim 1 wherein the tracking device further comprises a motion detector comprising an accelerometer and/or a magnetometer, wherein the motion detector is configured to detect a change in location of the tracking device.

10. The tracking device of claim 7, wherein when the tracking device is configured to transmit the received signal and/or altitude information in response to detecting a change in location that is greater than a threshold amount.

11. The tracking device of claim 1 wherein the tracking device is configured to transmit the received signal and/or altitude information at determined intervals.

12. The tracking device of claim 1 wherein the tracking device is configured to receive the at least one signal via a first network; and
   wherein the tracking device is configured to transmit the information based on the at least one signal and the altitude information on a second network, that is different to the first network, and/or on the first network.

13. The tracking device of claim 12 wherein the first network comprises a short-range communication network; and
   wherein the second network comprises a long-range communication network.

14. A method of tracking an asset at a facility, the method comprising:
   obtaining at least one signal from at least one beacon in proximity to a tracking device coupled to the asset;
   obtaining altitude information of the asset;

determining location information of the asset based on the at least one signal and the altitude information;

determining, by the tracking device, whether the asset is outside a predetermined range based on the at least one signal and the altitude information;

triggering deactivating components of the asset based on a determination that the asset is outside the predetermined range; and triggering reactivating components of the asset based on a determination that the asset returns to be within the predetermined range.

15. The method of claim 14 further comprising:

determining that the asset is outside a predetermined range; and triggering one or more of:

an alert action;

a memory wipe action;

a self-destruct action; and/or deactivating the asset, optionally wherein the method is performed in response to a request from a user.

16. The method of claim 14 further comprising receiving, at the tracking device, one or more of:

a wake-up message to send information in response to a user request; an update message for updating a security policy.

17. The method of claim 14 further comprising determining that the asset and/or the tracking device has been tampered with and sending an alert.

18. A non-transitory computer-readable medium storing instructions that, when executed by a processor, perform the method of claim 14.

19. A system for tracking an asset at a facility, the system comprising:

a tracking device for coupling to the asset, the tracking device comprising a communication interface and an altitude sensor;

one or more beacons; and a security server comprising at least one processor, wherein the security server is in communication with the tracking device; and wherein the system is configured to:

obtain, for determining the location of the asset:

at least one signal from at least one beacon; and altitude information from the altitude sensor; and determine, by the tracking device, whether the asset is outside a predetermined range based on the at least one signal and the altitude information;

trigger deactivating components of the asset based on a determination that the asset is outside the predetermined range; and trigger reactivating components of the asset based on a determination that the asset returns to be within the predetermined range.

20. The system of claim 19 wherein the tracking device is the tracking device of claim 1.

* * * * *